(12) United States Patent
Cooper et al.

(10) Patent No.: US 8,464,513 B2
(45) Date of Patent: Jun. 18, 2013

(54) CONTAMINATION DETECTION IN FUEL SYSTEM

(75) Inventors: Scott Donald Cooper, Ann Arbor, MI (US); Carlos Armesto, Canton, MI (US); Dwayne Pollitt, Novi, MI (US); Scott Szymusiak, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 12/845,606

(22) Filed: Jul. 28, 2010

(65) Prior Publication Data

US 2012/0023912 A1 Feb. 2, 2012

(51) Int. Cl.
*F01N 3/00* (2006.01)
*F01N 3/10* (2006.01)

(52) U.S. Cl.
USPC ............. 60/277; 60/286; 60/295; 60/301

(58) Field of Classification Search
USPC .................... 60/277, 286, 295, 301
See application file for complete search history.

(56) References Cited

U.S. PATENT DOCUMENTS

| | | | |
|---|---|---|---|
| 6,216,755 B1 | 4/2001 | Neufert | |
| 6,263,924 B1 | 7/2001 | Grosser | |
| 2007/0266697 A1 | 11/2007 | Nishina et al. | |
| 2008/0205478 A1 | 8/2008 | Sasanuma et al. | |
| 2009/0145823 A1 | 6/2009 | Lauer et al. | |
| 2009/0145903 A1* | 6/2009 | Soltis et al. ............. | 220/288 |
| 2009/0303466 A1 | 12/2009 | Arakawa et al. | |
| 2010/0007874 A1 | 1/2010 | Lunati et al. | |

OTHER PUBLICATIONS

RD 532046, Research Disclosure, Aug. 2008.*

* cited by examiner

*Primary Examiner* — Kenneth Bomberg
*Assistant Examiner* — Audrey K Bradley
(74) *Attorney, Agent, or Firm* — Julia Voutyras; Alleman Hall McCoy Russell & Tuttle LLP

(57) ABSTRACT

A system comprises a fuel system for delivering fuel to an engine for combustion and a reductant storage system for delivering reductant to the exhaust stream for an SCR catalyst for NOx reduction. The fuel system further comprises a water separator for separating water-based fluid from fuel in the fuel tank, and a separation reservoir to collect the separated water-based fluid. Based on readings of a water-in-fuel sensor positioned within the reservoir, a type of degradation (e.g., water build-up, high-water-content fuel, mis-filling of the reductant, etc.) may be determined and indicated.

18 Claims, 3 Drawing Sheets

CONTAMINATION DETECTION IN FUEL SYSTEM

TECHNICAL FIELD

The present application relates to a fuel system configured to deliver a reductant fluid to engine exhaust for a selective catalytic reduction (SCR) catalyst.

BACKGROUND AND SUMMARY

Emission standards for vehicles equipped with a diesel engine may dictate acceptable levels of NOx. To accomplish such reduction of NOx emissions, vehicles may be equipped with an SCR system that uses a fluid, such as diesel exhaust fluid (DEF) (e.g., urea), as the reductant. The DEF fluid may be carried in an onboard tank that requires periodic refilling. Further, in some systems, the DEF refill port may be located in direct proximity to the refill port for fuel, such as diesel fuel.

The inventors of the present application have recognized a problem in such previous solutions, in that it may be possible for a customer to mistakenly dispense DEF into the fuel tank. Adding DEF to the fuel tank could result in permanent degradation to the low and high pressure fuel system and/or degradation to the base engine due to the corrosive nature of some reductant fluids, such as urea.

Accordingly, in one example, some of the above issues may be addressed by a system comprising a reductant storage system including a reductant reservoir for holding a water-based reductant, and an exhaust delivery system to deliver the water-based reductant to the exhaust. The system further comprises a fuel system including a fuel tank, a water separator for separating water-based fluid from fuel in the fuel tank, and a separation reservoir to collect separated water-based fluid. The system further comprises a controller including instructions to indicate mis-filling of the water-based reductant into the fuel tank in response to an amount of water-based fluid in the separation reservoir.

In this way, since reductant is typically water-based, the fuel filter may react to remove the reductant from the diesel fuel and the reservoir would fill rapidly. Thus, detecting sufficient change in the reservoir after a fuel refill event indicates that contamination may have occurred (e.g., diesel fuel has been contaminated by the addition of reductant). The system can then notify the customer to take the appropriate action to prevent significant degradation to the fuel system and engine to reduce costly repairs. Further, since such detection can be implemented via instructions for a controller, any additional hardware inside the fuel system for detecting reductant contamination may be optionally eliminated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Embodiments of degradation determination in a fuel system are disclosed herein. Such determination may include determining a mis-filling of reductant into the fuel tank, as described in more detail hereafter.

Figure 1:
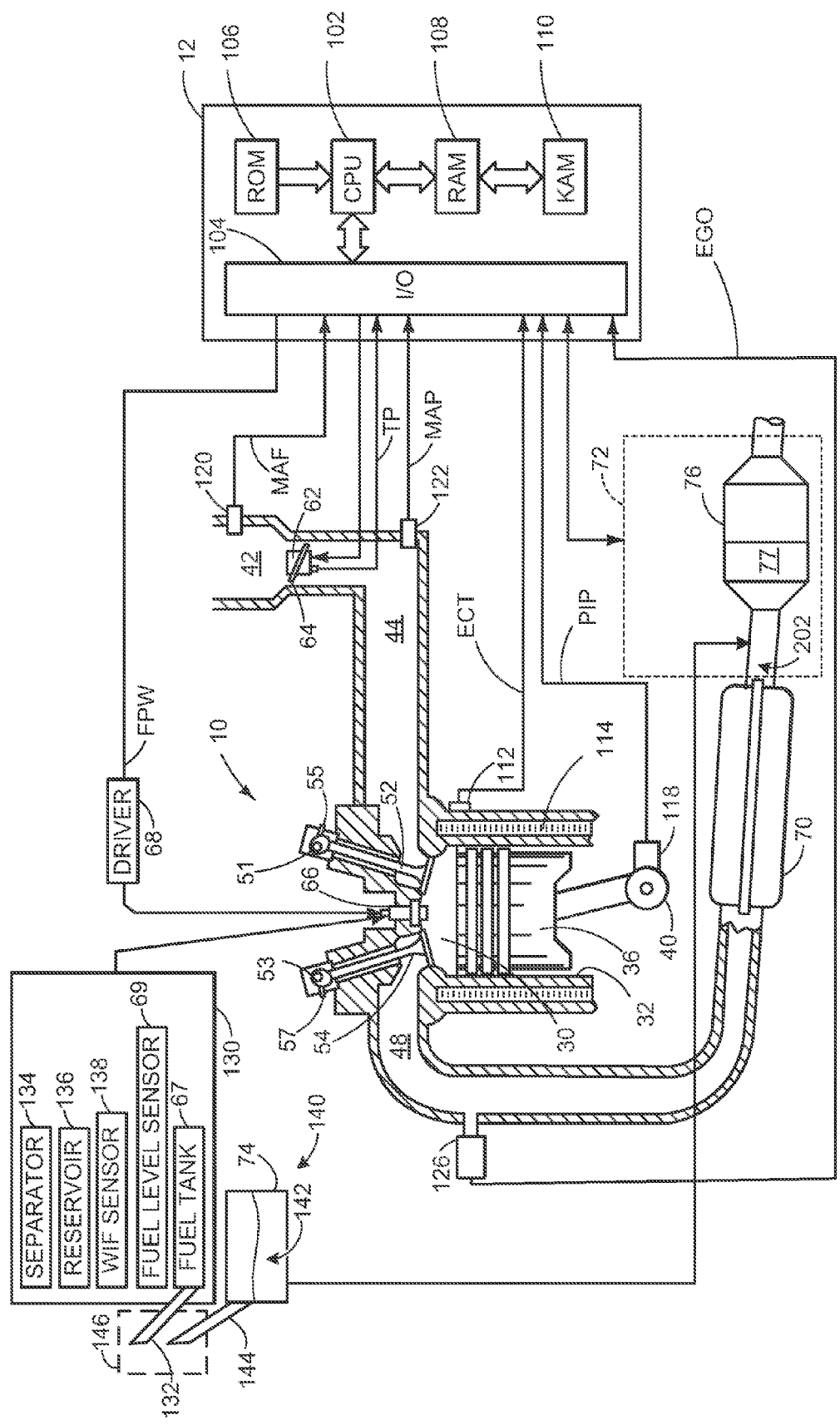
FIG. 1 shows a schematic depiction of an example engine in accordance with an embodiment of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator via an input device. The input device may include, for example, an accelerator pedal and a pedal position sensor for generating a proportional pedal position signal. Combustion chamber (cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, combustion chamber 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system 130 including a fuel tank 67, a fuel pump (not shown), and a fuel rail (not shown). In some embodiments, combustion chamber 30 may alternatively or additionally include a fuel injector arranged in intake manifold 44 in a configuration that provides what is known as port injection of fuel into the intake port upstream of combustion chamber 30.

Fuel system 130 may further include a fuel refill port 132 for filling fuel tank 67 with fuel, for example, during a fuel refill event. Fuel tank 67 is an example fuel storage vessel, and may further include a fuel tank fluid level sensor 69 coupled to the fuel tank and configured to detect a level of fuel within fuel tank 67. As such, fuel tank fluid level sensor 69 may be used for detecting a fuel refill of the fuel tank. In some embodiments, engine 10 may include a plurality of combustion chambers each having a plurality of intake and/or exhaust valves.

Fuel system 130 may further include a water separator 134 for separating water-based fluid from fuel in fuel tank 67 and a separation reservoir 136 to collect separated water-based fluid from fuel tank 67. Water separator 134 may be coupled to fuel tank 67, for example. Accordingly, separation reservoir 136 may be coupled to water separator 134. In some embodiments, separation reservoir 136 may be drainable such that separated water-based fluid may be drained from separation reservoir 136, for example, to rid the system of water-based fluid which may damage the fuel system and/or engine.

Fuel system 130 may further include a water-in-fuel (WIF) sensor 138 to detect the amount of water-based fluid in separation reservoir 136. WIF sensor 138 may be, for example, coupled to separation reservoir 136. WIF sensor 138 may be any suitable sensor (e.g., optical, thermal, or electric conductivity, etc.) and may be, for example, coupled to an inner surface of separation reservoir 136. In some embodiments, WIF sensor 138 may be positioned at a threshold level that corresponds to a pre-determined threshold volume of water-based fluid that has been separated from the fuel system. In other words, when the sensor detects that a threshold level of water-based fluid has been exceeded, a raw voltage signal may be produced by the sensor indicating a water-in-fuel condition. As nonlimiting examples, such an indication may include a driver notification via an indicator light and/or indication sound that informs the driver of the water-in-fuel condition. The threshold level may be pre-determined so as to correspond to, for example, a volume of water-based fluid wherein the probability of passing water-based fluid on to the engine is significantly increased. As such, WIF sensor 138 can indicate when the threshold level is reached, so as to avoid degradation to the fuel system and/or engine.

As a nonlimiting example, water separator 134 may separate out water-based fluid that has infiltrated the fuel supply system and may then filter the remaining fuel. Accordingly, fuel system 130 may further include a one-way check valve that allows fuel to flow to water separator 134. As such, WIF sensor 138 may then sense the conductivity of the liquid in which it is immersed. For example, WIF sensor 138 may be a multi-pronged WIF sensor, and may be arranged within water separator 134. As such, WIF sensor 138 may be configured to detect the conductivity of the liquid in which it is immersed by passing a current through the liquid via the prongs of the sensor.

WIF sensor 138 may be arranged as an at least two-prong sensor that indicates the conductivity of the liquid in which it is immersed by measuring the voltage potential between the prongs of the WIF sensor. As the WIF sensor is immersed in different liquids, different voltage potential signals may be produced. Said another way, WIF sensor 138 can detect whether the prongs are immersed in fuel or water-based fluid, for example. In this way, WIF sensor 138 can detect a presence of water-based fluid in fuel tank 67.

Fuel system 130 may further include additional components, such as a horizontal fuel conditioning module (HFCM) arranged downstream of fuel tank 67 to receive fuel from fuel tank 67, and a secondary fuel filter arranged downstream of the HFCM that may receive fuel from the HFCM. Additionally, the HFCM may house a fuel heater for increasing the temperature of the fuel and/or may include a fuel pump. Additionally, fuel system 130 may include a plurality of fuel supply pipes or passages for fluidically coupling the various fuel supply system components. For example, fuel tank 67 may be fluidically coupled to HFCM by a fuel supply line. Likewise, a secondary fuel filter may be fluidically coupled to HFCM by a fuel supply line. Furthermore, it should be appreciated that the various portions of the fuel supply system coupling the various fuel supply system components may include one or more bends or curves to accommodate a particular vehicle arrangement. Further still, it should be appreciated that in some embodiments, fuel system 130 may include additional components not illustrated in FIG. 1, such as various valves, pumps, restrictions, etc., or may omit components described herein, or combinations thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

An emission control system 72 is shown downstream of emission control device 70. Emission control system 72 may include a reductant storage system 140 including a reductant reservoir 74 (e.g., reductant storage vessel, reductant tank, etc.) and emission control device 76, which may include a selective catalytic reduction (SCR) catalyst 77. Reductant reservoir 74 may be configured to hold a water-based reductant 142 (e.g., urea, an ammonia-based solution, etc.). As such, emission control system 72 may further include an exhaust delivery system to deliver water-based reductant 142 to the exhaust. As an example, reductant reservoir 74 may be an on-board storage device for storing water-based reductant 142 used in emission control device 76. For example, emission control device 76 may be in communication with emission control device 70. Reductant reservoir 74 may supply water-based reductant 142 to exhaust stream 202 entering emission control device 76 for SCR catalyst 77. By injecting water-based reductant 142 into the exhaust stream 202 upstream of SCR catalyst 77, NOx emissions can be converted into other reaction products, such as diatomic nitrogen and water. As such, NOx emissions of the engine can be reduced. Reductant storage system 140 may further include a reductant refill port 144 for filling reductant reservoir 74 with water-based reductant 142. Moreover, reductant refill port 144 may be located in direct proximity to fuel refill port 132 and in a common vehicle body panel (e.g., an exterior rear-side body panel), such as within a port region 146.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

Controller 12 may include instructions for determining a type of degradation present in fuel tank 67 based on readings by WIF sensor 138, as well as instructions for indicating the type of degradation and emptying separation reservoir 136 based on the type of degradation. As introduced above, fuel system 130 may include a water separator 134 for separating water-based fluid from fuel. As such, water can be separated from fuel due to degradation conditions such as water-build up and/or high-water-content fuel. Further, since reductant is typically water-based, water separator 134 can also separate water-based reductant present in the fuel of fuel tank 67 and direct the separated reductant into the separation reservoir 136. In this way, reductant present in the fuel due to a mis-filling of the reductant can be removed from fuel tank 67 to minimize damage to the fuel system and/or engine.

As an example, controller 12 may include instructions for indicating water build-up in fuel tank 67. Such water build-up may be common under normal operation of engine 10. In comparison to other types of degradation such as high-water content fuel or mis-filling of reductant as described in more detail hereafter, water build-up under normal operation typically results in a smaller amount of water being directed into separation reservoir 136 and this water may enter at a slower rate. Accordingly, controller 12 may include instructions for determining the degradation type to be "water build-up" by determining the rate of change of the fluid level of water-based fluid within separation reservoir 136 is less than a first rate threshold, and/or determining the amount of water within separation reservoir 136 is greater than a first amount. Such determinations may be based on readings from WIF sensor 138. Further, controller 12 may also include instructions for emptying separation reservoir 136 upon determining the water-build up degradation.

As another example, controller 12 may include instructions for indicating high-water-content fuel within fuel tank 67. This type of degradation may occur after a refilling of the fuel at a pump having fuel with a higher water content than would typically be present in the fuel. Degradation due to high-water-content fuel typically results in more water being present in separation reservoir 136 than the aforementioned degradation due to water build-up, and the water may enter separation reservoir 136 more quickly than in the case of water build-up, especially in response to a fuel re-fill event where high-water-content fuel was just added. However, degradation due to high-water-content fuel also typically involves less water being present in separation reservoir 136 than degradation due to mis-filling of the reductant into the fuel tank, and the water may enter the separation reservoir 136 less quickly than in the case of the mis-filling. As such, controller 12 may include instructions for determining the degradation type to be "high-water-content fuel" by determining the rate of change of the fluid level of water-based fluid within separation reservoir 136 is greater than the first rate threshold yet less than a second rate threshold, and/or determining the amount of water within separation reservoir 136 is greater than a second amount. In such a case, the second rate threshold is greater than the first rate threshold, and the second amount is greater than the first amount. Such determinations may be based on readings from WIF sensor 138. Further, controller 12 may also include instructions for emptying separation reservoir 136 upon determining the high-water-content fuel degradation. Such emptying may be more urgent than emptying the reservoir due to water build-up, but may be less urgent than emptying the reservoir due to a mis-filling of reductant.

As another example, controller 12 may include instructions for indicating mis-filling of water-based reductant 142 into fuel tank 67. This type of degradation may occur after a refilling of the reductant, wherein an operator may mistakenly add water-based reductant 142 to fuel refill port 132 instead of reductant refill port 144. Such mis-filling may not necessarily be uncommon, given the close proximity of the reductant refill port 144 to the fuel refill port 132, for example in port region 146. In such a case, a larger amount of water-based fluid is then present in separation reservoir 136 in comparison to degradation due to water build-up and/or high-water-content fuel. Furthermore, degradation due to mis-filling may also result in water entering the separation reservoir 136 more quickly than in the case of water build-up and/or high-water-content fuel. As such, controller 12 may include instructions for determining the degradation type to be "mis-filling of reductant" by determining the rate of change of the fluid level of water-based fluid within separation reservoir 136 is greater than the second rate threshold, and/or determining the amount of water within separation reservoir 136 is greater than a third amount. In such a case, the third amount is greater than the second amount and thus also greater than the first amount. Such determinations may be based on readings from WIF sensor 138. Further, controller 12 may also include instructions for emptying separation reservoir 136 upon determining the mis-filling of reductant. Given the larger amount of reductant present in mis-filling degradation than present in other types of degradation, such emptying may be more urgent than emptying the reservoir due to water build-up and/or high-water-content fuel.

Indicating the type of degradation present within the system is described in more detail below with reference to FIGS. 2 and 3.

As described above, FIG. 1 shows only one cylinder of a multi-cylinder engine, and that each cylinder may similarly include its own set of intake/exhaust valves, fuel injector, spark plug, etc.

Figure 2:
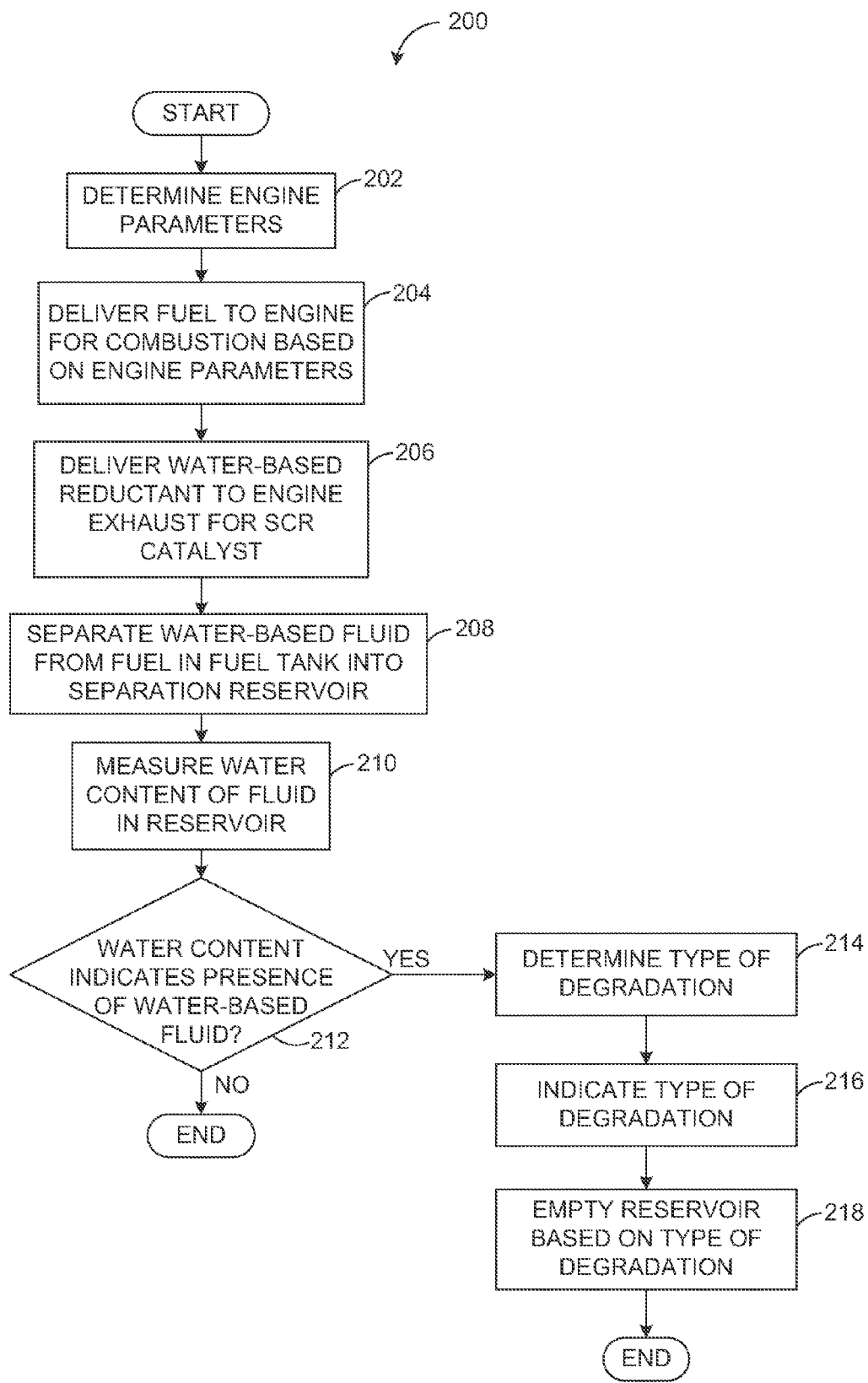
FIG. 2 shows a flow diagram for an example method of controlling an engine in accordance with an embodiment of the present disclosure.

Turning now to FIG. 2, FIG. 2 illustrates a method 200 for controlling an engine such as engine 10 of FIG. 1. At 202, engine parameters are determined. Examples of such engine parameters include, but are not limited to, receiving an operator input, determining a reductant injection amount (e.g., an amount of water-based reductant 142 of FIG. 1), determining an amount of fuel to be injected (e.g., an amount of fuel within fuel tank 67 of FIG. 1), etc. At 204, fuel is delivered to the engine based on the engine parameters. For example, in the case of fuel system 130 of FIG. 1, fuel system 130 may store fuel in fuel tank 67 and may deliver the fuel to fuel injector 66 for combustion in combustion chamber 30 of engine 10.

At 206, water-based reductant (e.g., urea, an ammonia solution, etc.) is delivered to the engine exhaust. For example, in the case of reductant storage system 140 of FIG. 1, reductant storage system 140 may store water-based reductant 142 (e.g., urea solution) in reductant reservoir 74 (e.g., urea reservoir) and may deliver water-based reductant 142 to exhaust stream 202 of engine 10 for SCR catalyst 77. As described above, by injecting water-based reductant into the exhaust stream upstream of the catalyst, NOx emissions can be converted into other reaction products, such as diatomic nitrogen and water. As such, NOx emissions of the engine can be reduced.

At 208, water-based fluid may be separated from fuel in the fuel tank into a separation reservoir. For example, if any water and/or other water-based fluid has entered the fuel tank, the water separator (e.g., 134 of FIG. 1) may be utilized to separate the water-based fluid from the fuel and direct the water-based fluid into the drainable separation reservoir (e.g., 136 of FIG. 1). In this way, water-based fluid present in the fuel tank can be removed so as to reduce damage to engine and fuel system components.

At 210, the water content of fluid in the separation reservoir is measured. In this way, it may be determined, at 212, if the water content is such that it indicates presence of water-based fluid. For example, a WIF sensor such as WIF sensor 138 of FIG. 1 may be positioned in the separation reservoir (e.g., 136 of FIG. 1) and may indicate whether water-based fluid is present in the reservoir. If it is determined that water-based fluid is not present, then method 200 ends and the engine continues to operate under normal operating conditions.

However, if it is determined that water-based fluid is present, then at 214 the type of degradation is determined. As introduced above with reference to FIG. 1, types of degradation may include, but are not limited to, water build-up, high-water-content fuel, and mis-filling of reductant.

Method 200 then proceeds to 216, where the type of degradation as determined at 214 is indicated. In some embodiments, this may include generating a human-readable warning signal to a driver, such as a message on a message center in the vehicle, a verbal indication, an audible indication, etc. Further, such indication may not only indicate the type of degradation, but may further indicate an urgency given the type of degradation. For example, a mis-filling of reductant into the fuel tank may be more urgent than other types of degradation such as water build-up and/or high-water-content fuel.

Method 200 then proceeds to 218, where the reservoir is emptied based on the type of degradation as determined at 214. For example if the degradation is simply water build-up due to normal operation, the reservoir may be emptied at a subsequent servicing of the vehicle. However, if the degradation condition is more urgent, such as a mis-filling of reductant into the fuel tank, the reservoir may be emptied more quickly than for other types of degradation.

It should be appreciated that method 200 is not intended to be limiting in any manner, and thus may further include additional measurements, determinations and/or actions not illustrated in FIG. 2. For example, method 200 may further include taking a default action in response to the mis-filling indication. Such a default action may include limiting maximum vehicle speed to a lower threshold vehicle speed, and disabling reductant injection into engine exhaust, for example.

Figure 3:
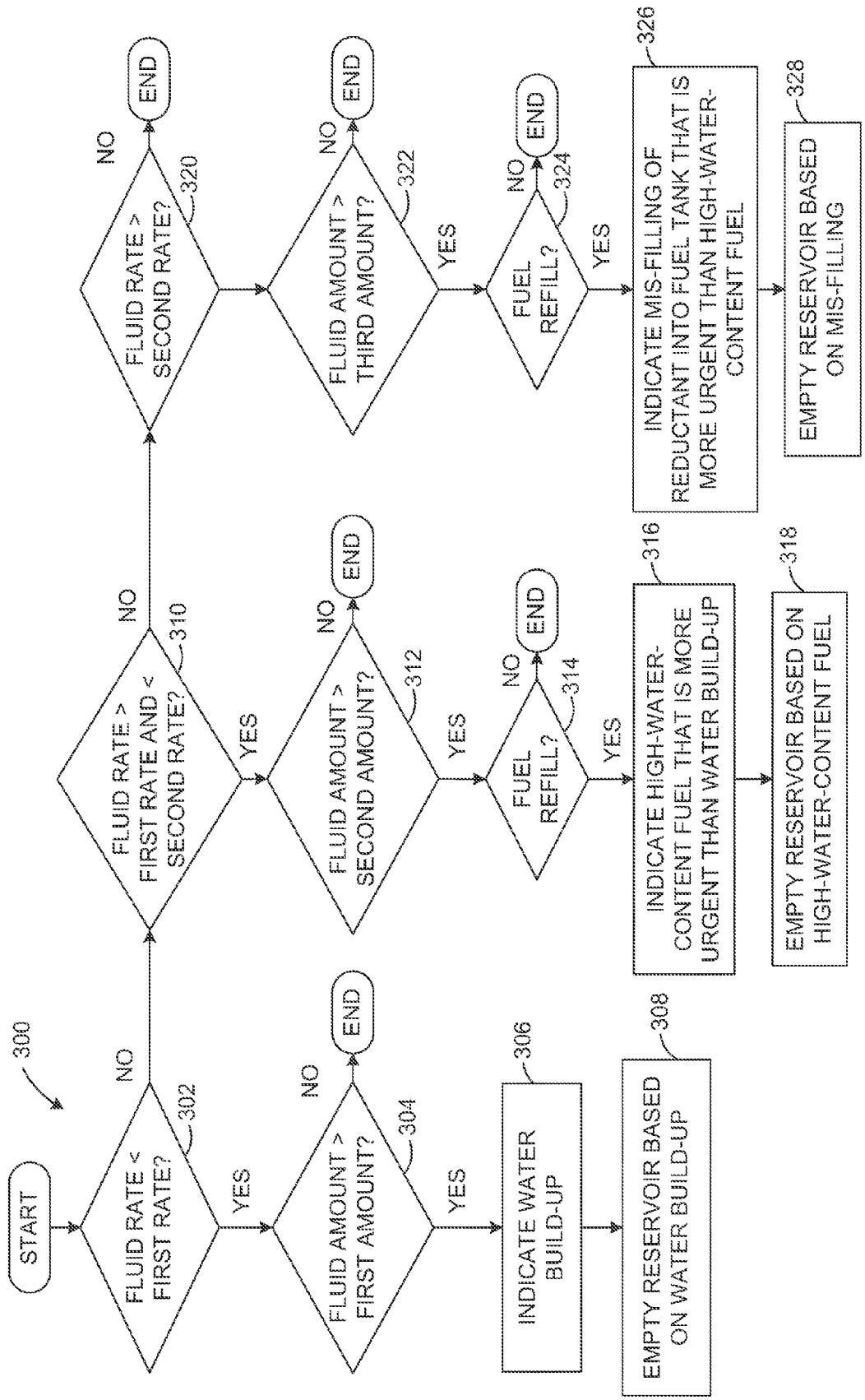
FIG. 3 shows a flow diagram for an example method of determining the type of degradation within the method of FIG. 2.

Turning now to FIG. 3, FIG. 3 illustrates an example method 300 of determining a type of degradation. As such, method 300 may be utilized in some embodiments of method 200, namely at 214. Types of degradation may include, but are not limited to, water build-up, high-water-content fuel, and mis-filling of the reductant into the fuel tank. As described above with reference to FIG. 1, each type of degradation may result in a different amount of separated fluid being present within the separation reservoir (e.g., separation reservoir 136 of FIG. 1) and/or a different rate of change of the fluid level of the separated fluid within the reservoir, based on readings via a WIF sensor such as WIF sensor 138. As such, the type of degradation may be determined based on the amount of separated fluid and/or the rate of change of the fluid level of the separated fluid, described in more detail as follows.

At 302, method 300 includes determining if a rate of change of a fluid level of the water-based fluid (e.g., a fluid rate) separated into the separation reservoir (e.g., separation reservoir 136 of FIG. 1) is less than a first threshold rate. The first threshold rate may correspond to a rate typically not exceeded under normal operation where water build-up may occur. If if it is determined that the rate of change of the separated fluid is less than the first rate, method 300 proceeds to 304 where it is determined if the amount of separated fluid is greater than a first threshold amount. The first threshold amount may correspond to an amount typically not exceeded under normal operation, but may be exceeded in the event of water build-up during normal operation. Thus, if it is determined that the amount of separated fluid is greater than the first threshold amount, then method 300 proceeds to 306, and a "water build-up" degradation is indicated. Accordingly, method 300 then proceeds to 308, where the reservoir may be emptied based on the water build-up degradation. Given that water build-up may occur during normal operation of the engine, emptying of the reservoir for this type of degradation may not necessarily be urgent, and may be delayed if desired, for example, until a subsequent servicing of the vehicle.

If it is determined at 304 that the fluid amount is not greater than the threshold amount, then method 300 ends. In such a case, water-based fluid may be entering the reservoir as such a slow rate substantially below the first rate that the water-based fluid is slow to accumulate in the reservoir, and thus the separated fluid amount has not yet exceeded its threshold.

Further, it should be appreciated that in some embodiments, water build-up may instead be indicated based on the fluid rate or the fluid amount.

Continuing with FIG. 3, if it is determined at 302 that the rate of change of the separated fluid level in the reservoir is not below the first rate threshold, method 300 proceeds to 310 where it is determined if the rate of change of the separated fluid level is greater than the first rate threshold yet below a second rate threshold, wherein the second rate threshold is greater than the first rate threshold. Said another way, it is determined if the fluid rate falls within a range of rate values greater than the first rate. This range of rates may correspond to rates typically not exceeded during water build-up during standard operation of the engine, and may instead correspond to rates present during other types of degradation where more water-based fluid is present.

If it is determined that the rate of change of the separated fluid is greater than the first rate but less than the second rate, method 300 proceeds to 312 where it is determined if the amount of separated fluid is greater than a second threshold amount, wherein the second threshold amount is greater than the first threshold amount. The second threshold amount may correspond to an amount typically not exceeded under normal operation and/or during degradation due to water build-up, but may instead be exceeded during other types of degradation where more water-based fluid is present.

Since such an increased presence of water within the fuel may be a result of refueling with a fuel at a pump which has an unusually high water content, if it is determined that the amount of separated fluid is greater than the second threshold amount method 300 proceeds to 314 where it is determined if a fuel refill event has occurred (e.g., a fuel refill event prior to the increased amount of water-based fluid in the separator). As an example, a fuel level sensor such as fuel tank fluid level sensor 69 of FIG. 1 may indicate an increase in the fuel level greater than a threshold value and signal that a fuel refilling event has occurred.

If it is determined that a fuel refill event has not occurred or that the fluid amount is not greater than the second amount, then method 300 ends. In such cases, although the fluid rate suggests an increased presence of water-based fluid, the fluid may not have accumulated to a problematic level within the separator yet.

If it is determined that a fuel refilling event has occurred, then method 300 proceeds to 316, and a "high-water-content fuel" degradation is indicated. Such an indication may be more urgent than a water build-up condition since there is more water in the system and thus an increased likelihood of possible damage to the system. Accordingly, method 300 then proceeds to 318, where the reservoir may be emptied based on the high-water-content fuel degradation. Given that high-water-content fuel is typically a result of watery fuel at the pump, as opposed to degradation due to water build-up during normal operation of the engine, emptying of the reservoir for this type of degradation may be more urgent than that due to water build-up. As such, high-water-content fuel may be a more-intensive fuel contamination than water-build-up, but a less-intensive fuel contamination than other types of degradation such as mis-filling of the reductant.

Further, it should be appreciated that in some embodiments, high-water-content fuel degradation may instead be indicated based on the fluid rate or the fluid amount.

Continuing with FIG. 3, if it is determined at 310 that the rate of change of the separated fluid level in the reservoir does not fall within the range of rates defined between the first rate and second rate, then method 300 proceeds to 320. At 320, it is determined if the rate of change of the separated fluid level is greater than the second rate. Said another way, it is determined if the fluid rate is greater than that which may indicate a high-water-content fuel degradation.

If it is determined that the rate of change of the separated fluid is greater than the second rate, method 300 proceeds to 322 where it is determined if the amount of separated fluid is greater than a third threshold amount, wherein the third threshold amount is greater than the second threshold amount. The third threshold amount may correspond to an amount typically not exceeded under normal operation and/or degradation due to water build-up or high-water-content fuel, but may instead be exceeded during other types of degradation where more water-based fluid is present such as due to a mis-filling of the reductant into the fuel tank.

Accordingly, if it is determined that the amount of separated fluid is greater than the third threshold amount, method 300 proceeds to 324 where it is determined if a fuel refill event has occurred (e.g., a fuel refill event prior to the increased amount of water-based fluid in the separator). As an example, a fuel level sensor such as fuel tank fluid level sensor 69 of FIG. 1 may indicate an increase in the fuel level greater than a threshold value and signal that a fuel refilling event has occurred. In some embodiments, determining if a fuel refill event has occurred may further include determining that a reductant refill event has not occurred. Said another way, the fuel refill event may exclude a reductant refill event. For example, if a reductant level sensor indicates that the reductant level is low and has not be recently refilled, then this further suggests that the fuel refill event resulting in an increased presence of water-based fuel may be a mis-filling of the reductant into the fuel tank.

If it is determined that a fuel refilling event has not occurred, or that the fluid amount is not greater than the third amount, or the fluid rate is not greater than the second rate, then method 300 ends. In such cases, although the fluid rate suggests an increased presence of water-based fluid, the fluid may not have accumulated to a problematic level within the separator yet.

If it is determined that a fuel refilling event has occurred, then method 300 proceeds to 326, and a "mis-filling of the reductant" degradation is indicated. Such an indication may be more urgent than other degradations since the relatively larger amount of reductant in the fuel could damage the system. Accordingly, method 300 then proceeds to 328, where the reservoir may be emptied based on the mis-filling of the reductant into the fuel tank. Given the increased likelihood of damage due to this type of degradation, emptying of the reservoir may be more urgent for degradation due to mis-filling in comparison to other types of degradation.

Further, it should be appreciated that in some embodiments, mis-filling of reductant into the fuel tank may instead be indicated based on the fluid rate or the fluid amount.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A system, comprising:
   a reductant storage system including a reductant reservoir for holding a water-based reductant, and an exhaust delivery system to deliver the water-based reductant to exhaust;
   a fuel system including a fuel tank, a water separator for separating water-based fluid from fuel in the fuel tank, and a separation reservoir to collect separated water-based fluid;
   a controller including instructions to indicate mis-filling of the water-based reductant into the fuel tank in response to an amount of separated water-based fluid, and
   a water-in-fuel sensor to detect the amount of water-based fluid in the separation reservoir or a rate of change of water content.

2. The system of claim 1, wherein the controller includes instructions to indicate the mis-filling in response to the amount of separated water-based fluid being greater than a threshold amount and increasing at a rate greater than a threshold rate.

3. The system of claim 1, wherein the controller further includes instructions to indicate the mis-filling in response to a rate of change of a fluid level of separated water-based fluid.

4. The system of claim 1, wherein the water-based reductant is urea.

5. The system of claim 1, wherein the system further includes a reductant refill port and a fuel refill port, the fuel refill port located in direct proximity to the reductant refill port and in a common vehicle body panel, the vehicle body panel being an exterior rear-side body panel.

6. The system of claim 1, wherein the instructions to indicate the mis-filling include instructions to generate a human-readable warning signal to a driver.

7. The system of claim 1, wherein the separation reservoir is drainable such that separated water-based fluid may be drained from the separation reservoir.

8. The system of claim 1, wherein the controller further includes instructions to indicate the mis-filling in response to the amount of separated water-based fluid after a fuel tank refill event.

9. The system of claim 8, wherein the controller further includes instructions to indicate the mis-filling in response to a change in a reductant reservoir level being less than a threshold amount after the fuel tank refill event.

10. The system of claim 9, wherein the controller further includes instructions to take a default action in response to indication of the mis-filling, the default action including limiting maximum vehicle speed to a lower threshold vehicle speed, and disabling reductant injection into engine exhaust.

11. A method for an engine, comprising:
    storing a water-based urea solution in a urea reservoir and delivering the urea solution to an SCR catalyst;
    storing fuel in a fuel tank and delivering the fuel to the engine for combustion;
    separating water-based fluid from fuel in the fuel tank via a separator into a separation reservoir; and
    indicating mis-filling of the urea solution into the fuel tank in response to water content of the separated fluid and a rate of change of a fluid level of the separated fluid being greater than a threshold amount.

12. The method of claim 11, wherein indicating mis-filling includes indicating a presence of urea solution in the fuel tank.

13. The method of claim 11, further comprising indicating the mis-filling further in response to a refill event prior to an increase in an amount of the separated fluid.

14. The method of claim 13, wherein the refill event includes a fuel refill event and excludes a urea solution refill event.

15. A fuel system, comprising:
    a fuel tank for fuel;
    a fuel tank fluid level sensor coupled to the fuel tank;
    a reductant tank for water-based reductant;
    a water-based fluid separator coupled to the fuel tank;
    a reservoir coupled to the water-based fluid separator receiving separated water-based fluid from the fuel tank;
    a water-in-fuel sensor coupled to the reservoir; and
    a control system comprising a computer readable storage medium, the medium comprising instructions for:
        in response to a fuel refill event with no reductant refill event, indicating a first type of fuel contamination via the water-in-fuel sensor if an amount of separated water-based fluid exceeds a first threshold value and a rate of change of a fluid level of the separated water-based fluid exceeds a first threshold rate; and
        in response to the fuel refill event with a reductant refill event, indicating a second type of less-intensive fuel contamination via the water-in-fuel sensor if the amount of separated water-based fluid exceeds a second, lower, threshold value but not the first threshold value, and the rate of change of the fluid level of the separated water-based fluid exceeds a second, lower, threshold rate, but does not exceed the first threshold rate.

16. The fuel system of claim 15, wherein the first type of contamination includes a mis-filling of water-based reductant into the fuel tank during the fuel refill event.

17. The fuel system of claim 15, further comprising a reductant refill port for filling the reductant tank with water-based reductant and a fuel refill port for filling the fuel tank with fuel, the fuel refill port located in direct proximity to the reductant refill port.

18. The fuel system of claim 15, further comprising an SCR catalyst.

* * * * *